US006304250B1

(12) United States Patent
Yang et al.

(10) Patent No.: US 6,304,250 B1
(45) Date of Patent: Oct. 16, 2001

(54) WIRE/WIRELESS KEYBOARD WITH POINTING DEVICE ATTACHABLE THERETO, COMPUTER SYSTEM FOR USE WITH THE SAME, AND RELATED METHOD

(75) Inventors: Chang-Hwan Yang; Sung-Soo Kim, both of Kyunggi-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/058,853

(22) Filed: Apr. 13, 1998

(30) Foreign Application Priority Data

Apr. 12, 1997 (KR) .................................................. 97-13519

(51) Int. Cl.$^7$ ................................. G09G 5/00; G09G 5/08
(52) U.S. Cl. ........................... 345/168; 345/161; 345/163; 345/167; 345/169; 341/22; 341/23
(58) Field of Search .................................. 345/156–172; 341/22, 23; 361/680

(56) References Cited

U.S. PATENT DOCUMENTS

| | | | |
|---|---|---|---|
| 4,099,437 | 7/1978 | Stavrou et al. | 84/1.01 |
| 4,578,674 | 3/1986 | Baker et al. | 340/710 |
| 4,754,268 | 6/1988 | Mori | 340/710 |
| 5,189,543 | 2/1993 | Lin et al. | 359/142 |
| 5,247,285 | 9/1993 | Yokota et al. | 345/169 |
| 5,440,502 | 8/1995 | Register | 364/708.1 |
| 5,541,621 | 7/1996 | Nmngani | 345/167 |
| 5,726,684 | 3/1998 | Blankenship et al. | 345/167 |
| 5,786,983 | * 7/1998 | Brenner et al. | 361/680 |
| 5,861,822 | * 1/1999 | Park et al. | 341/22 |
| 5,886,686 | * 3/1999 | Chen | 345/168 |
| 5,958,023 | * 9/1999 | Klein | 710/18 |

* cited by examiner

Primary Examiner—Bipin Shalwala
Assistant Examiner—Jimmy H. Nguyen
(74) Attorney, Agent, or Firm—Robert E. Bushnell, Esq.

(57) ABSTRACT

A low power-consumption keyboard with a pointing device attachable thereto and for use with the same comprises: a battery for supplying a power source voltage for the keyboard; a key matrix having a set of keys for generating a key code corresponding to a depressed key of the keys; a key function indicator for indicating a key function state corresponding to a depressed specific function key of the keys; a controller for selectively controlling the key code to be transmitted to the computer system by either wire communication or wireless communication; and a wireless transceiver for converting the key code into a wireless signal and for transmitting the wireless signal to the computer system. With this construction, the key function indicator is disabled during wireless communication and enabled during wire communication.

22 Claims, 17 Drawing Sheets

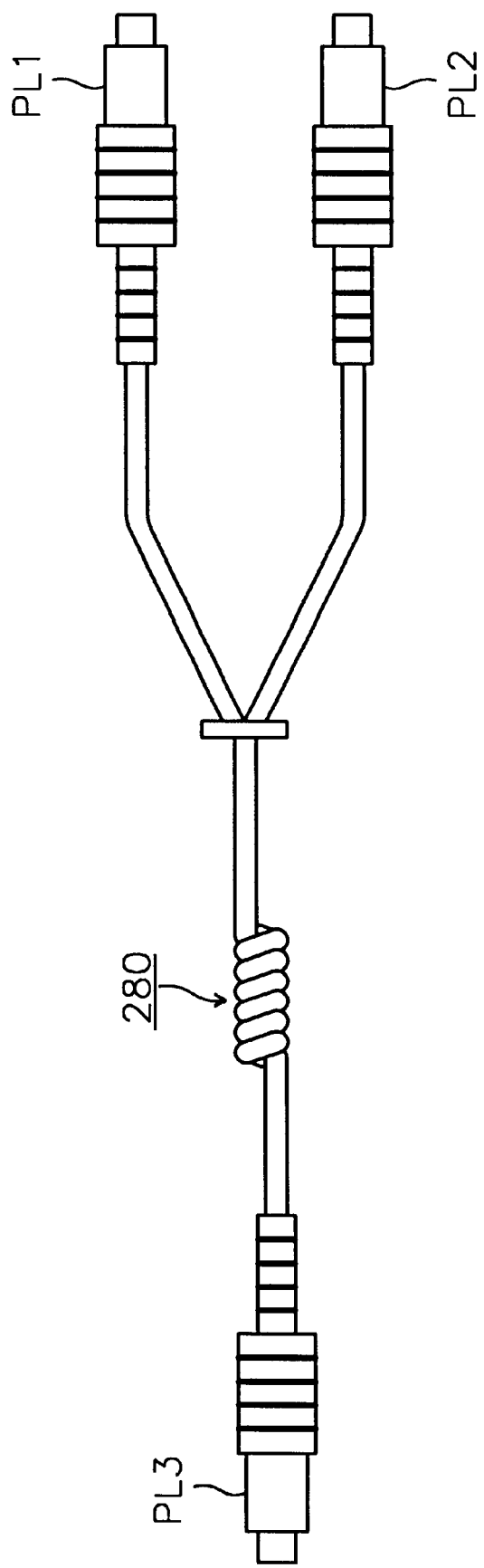

WIRE/WIRELESS KEYBOARD WITH POINTING DEVICE ATTACHABLE THERETO, COMPUTER SYSTEM FOR USE WITH THE SAME, AND RELATED METHOD

CLAIM OF PRIORITY

This application makes reference to, incorporates the same herein, and claims all benefits accruing under 35 U.S.C. §119 from an application for WIRE/WIRELESS KEYBOARD WITH POINTING DEVICE ATTACHABLE THERETO AND COMPUTER SYSTEM FOR USE WITH THE SAME earlier filed in the Korean Industrial Property Office on Apr. 12, 1997 and there duly assigned Ser. No. 13519/1997.

BACKGROUND OF THE INVENTION

1. Technical Field

The present invention relates to a data input system with a pointing device attachable thereto and for use in a computer system, and a related method, and more particularly, to a wire/wireless keyboard which allows wire and wireless communication with a computer system and reduces battery power consumption of during the wireless communication, and a computer system for use with the same.

2. Related Art

Computer systems having a wireless keyboard and a pointing device, such as a mouse, are well known in the art. However, as explained in more detail below, significant problems are experienced in such systems.

For example, when a wireless keyboard operates in accordance with wireless communication and is powered by a battery voltage, the battery voltage rapidly becomes lowered due to, for example, the key function indicator typically provided on such a keyboard having a relatively high power consumption, such high power consumption typically being caused by the necessity to employ LEDs (light emitting diodes).

In addition, such systems have the further disadvantage that, since the mouse is directly connected to the computer, while the wireless keyboard communicates with the processor via wireless communications, a user entering data into the computer using the wireless keyboard is able to do so from a remote location, but then has to suffer a great inconvenience when it becomes necessary to point to data using the pointing device or mouse.

Therefore, there is a need in the art for the development of a wireless keyboard which does not experience the problem of high power consumption and inconvenience in use with a wired pointing device, as explained above.

The following patents are considered to be representative of the prior art, and are burdened by the disadvantages set forth herein: U.S. Pat. No. 5,726,684 to Blankenship et al., entitled *Detachable Convertible Mouse-Trackball Pointing Device For Use With A Computer;* U.S. Pat. No. 5,541,621 to Nmngani, entitled *Mouse Or Trackball System;* U.S. Pat. No. 5,440,502 to Register, entitled *Stylus Operable Computer With Wireless Keyboard In Storage Bay;* U.S. Pat. No. 5,247,285 to Yokota et al., entitled *Standup Portable Personal Computer With Detachable Wireless Keyboard And Adjustable Display;* U.S. Pat. No. 5,189,543 to Lin et al., entitled *Infra-red Wireless Keyboard System;* U.S. Pat. No. 4,754,268 to Mori, entitled *Wireless Mouse Apparatus;* U.S. Pat. No. 4,578,674 to Baker et al., entitled *Method And Apparatus For Wireless Cursor Position Control;* and U.S. Pat. No. 4,099,437 to Stavrou et al., entitled *Remote Control Wireless Keyboard Musical Instrument.*

SUMMARY OF THE INVENTION

The present invention is intended to solve the above problems, and it is an object of the invention to provide a wire/wireless keyboard to which a pointing device is removable connected, and a related method.

It is a further object of the present invention to provide a wire/wireless keyboard with low power-consumption by turning-on a specific key function indicator of a computer system when the keyboard operates with wireless communication and when one of specific function key pad thereon is struck.

It is another object of the present invention to provide a wire/wireless keyboard to which a pointing device is removable connected, and through which output signals of the pointing device are selectively transmitted by wire/wireless communication to a computer system.

It is an additional object of the present invention to provide a wire/wireless keyboard to which a pointing device is removably connected, and through which output signals of the pointing device are selectively transmitted by wire/wireless communication to a computer system. of the keyboard or pointing device with a computer system.

It is another object of the present invention to provide a computer system having a key function indicator thereon which can be turned on by depressing a specific function key when a wire/wireless keyboard operates with wireless communication.

In order to achieve the above-mentioned objects of the present invention, there is provided a wire/wireless keyboard when comprises: a battery for supplying a power source voltage for the keyboard; a key matrix having a set of keys for generating a key code corresponding to a depressed key; a wireless signal transceiver for converting the key code into a wireless signal and transmitting the wireless signal to the computer system; and a controller for controlling key function indicating data to be supplied to and displayed on the computer system, said key function indicating data being indicative of a key function state corresponding to a specific function.

According to a further aspect of the present invention, a wire/wireless keyboard for use with a computer system and allowing wire/wireless communication of the keyboard with the computer system comprises: a battery for supplying a power source voltage for the keyboard; a key matrix having a set of keys for generating a key code corresponding to a depressed key; a key function indicator for indicating a key function state corresponding to a depressed specific function key of the keys; a controller for selectively controlling the key code to be transmitted to the computer system by either wire communication or wireless communication; and a wireless transceiver for converting the key code into a wireless signal and transmitting the wireless signal to the computer system, wherein the key function indicator is disabled when the key code is transmitted by wireless communication.

According to another aspect of the present invention, a computer system having a data input device which has a set of keys and a computer comprises a key function indicator formed on the computer for indicating a key function state corresponding to a depressed specific function key of the keys. The computer has a front vessel on which the key function indicator is formed.

According to another aspect of the present invention, a computer system has a computer and a first data input device which allows wire/wireless communication with the computer. The first data input device comprises: a battery for supplying a power source voltage for the first data input device; a key matrix having a set of keys for generating a key code corresponding to a depressed key of the keys; a first key function indicator for indicating a key function state Corresponding to a depressed specific function key of the keys; a first controller for selectively controlling the key code to be transmitted to the computer by either wire communication or wireless communication; and a first wireless transceiver for converting the key code into a wireless signal and transmitting the wireless signal to the computer. The computer comprises: a second key function indicator for indicating the key function state corresponding to the depressed specific function key of the keys; and a second controller for receiving the wireless signal from the first wireless transceiver and for determining whether or not the wireless signal thus received is one of specific function keys to generate a control signal. The first key function indicator is disabled when the key code is transmitted by the wireless communication, and the second key function indicator is enabled when the wireless signal thus received is a specific function key.

According to an additional aspect of the present invention, a method of operating a wire/wireless keyboard allows wire/wireless communication with a computer system, said wire/wireless keyboard having a key function indicator indicative of a specific key function state of a depressed specific function key. The method comprises the steps of: determining whether the keyboard operates with either wire or wireless communication with the computer system; if the keyboard operates with wire communication, enabling the key function indicator of the keyboard; if the keyboard operates with wireless communication, disabling the key function indicator of the keyboard; and transmitting a wire/wireless signal corresponding to a key input.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 7A is an expanded view of the cable shown in FIG. 6;

DETAILED DESCRIPTION OF PREFERRED EMBODIMENTS

Figure 1:
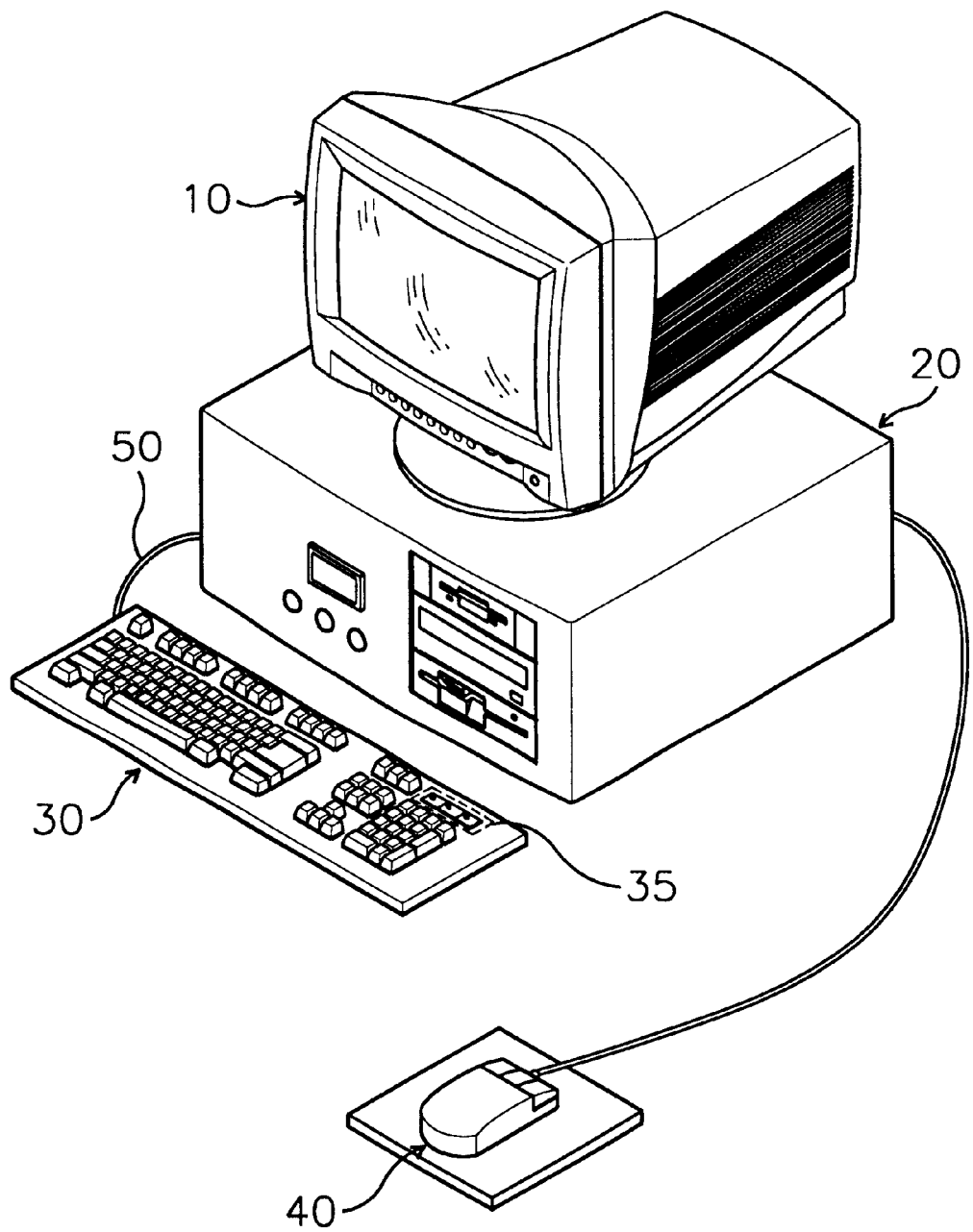
FIG. 1 is a perspective view of a computer system having a wire keyboard and a pointing device which are connected to the computer.

FIG. 1 is a perspective view of a computer system having a wire keyboard and a pointing device which are connected to the computer. In this figure, the computer system is based on a computer 20 and includes a set of user interface devices to allow the user to provide data to and receive information from the computer system. In particular, the computer system includes a monitor 10, which is the primary output interface component from the computer 20 to the user. For user-to-computer interfacing, a wire keyboard 30 is connected through a DIN (Deutch Industrie Norm) connector cable 50 to the computer 20 to allow the user to enter data and direct the execution of the software. When keys on the keyboard 30 are struck, the keyboard 30 generates a set of signals that indicates which keys have been depressed. As the user enters data into the computer 20, the data is displayed on the monitor 10. The computer system includes a mouse 40 as a pointing device for data manipulation. The mouse 40 is used to designate data for manipulation, although any type of electronic pointing device used for designating data in computer systems may be used. Although not shown, the computer system also includes a printer, a plotter, etc.

As shown in FIG. 1, however, since the length of the DIN connector cable 50 is standardized, and thereby limited within a definite range, the wire keyboard 30 cannot be moved over the definite range. If the DIN connector cable 50 having a length of more than the definite range is used between the wire keyboard 30 and the computer 20, noise may be introduced through the cable 50, and as a result data entry from the keyboard to the computer may be unstable.

Figure 2:
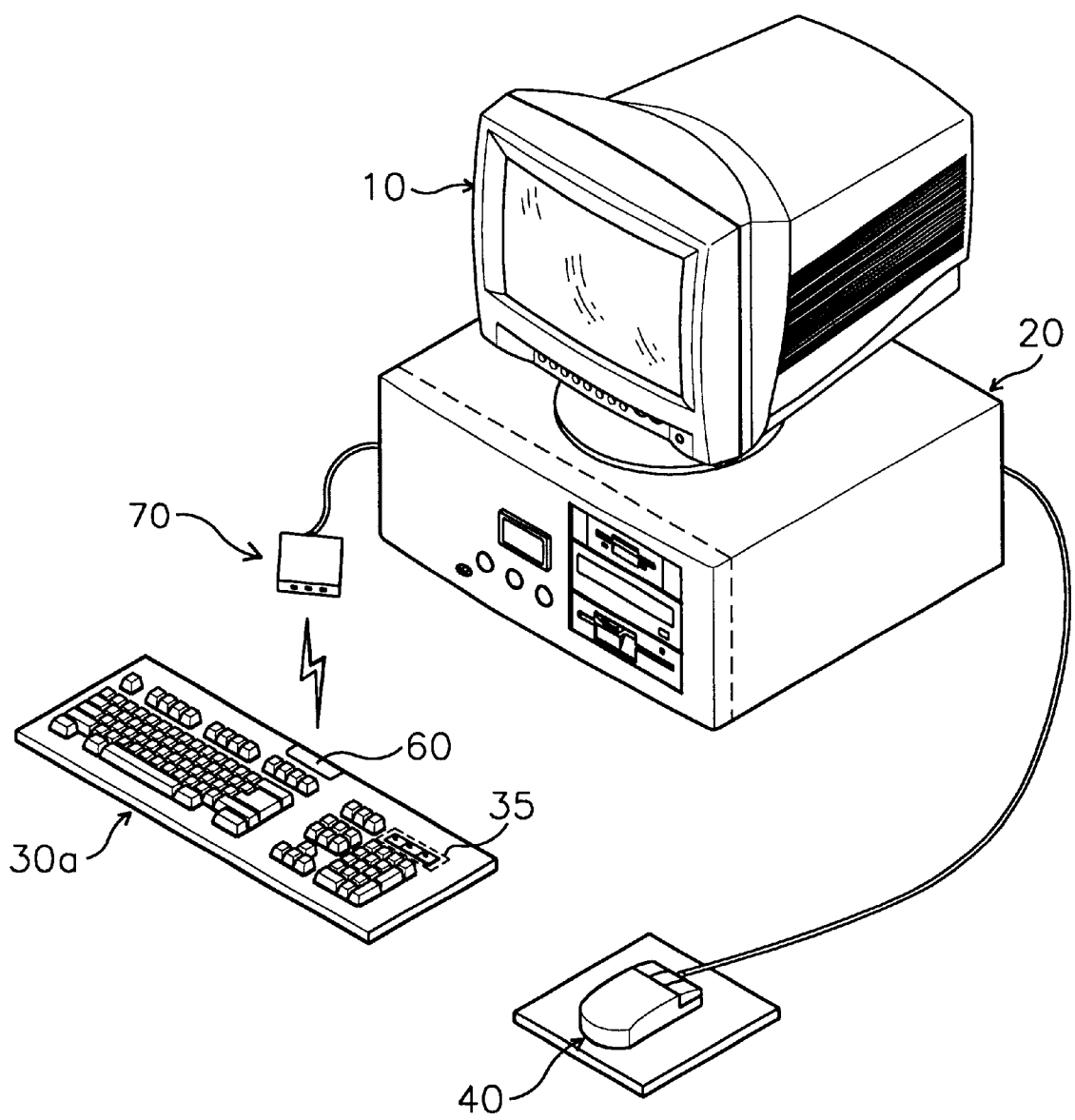
FIG. 2 is a perspective view of another computer system having a wireless keyboard and a pointing device which are connected to the computer.

So as to eliminate the above-mentioned problem, a wireless keyboard has been proposed. FIG. 2 is a perspective view of another computer system having a wireless keyboard and a pointing device which are connected to the computer. In this figure, the computer system includes a wireless keyboard 30a which allows a user to enter data and direct the execution of the software as in the wire keyboard 30 of FIG. 1. The wireless keyboard 30a converts a key code, which is generated when a key is struck, into a wireless signal, and transmits the converted wireless signal through a wireless signal transmitter 60 and wireless signal receiver 70 to the computer 20. Since the wireless keyboard 30a operates with a battery voltage from a battery located therein, there arises a problem in that the battery has to be frequently changed.

Also, the wireless keyboard 30a includes key pads which are used to perform specific key functions, such as number lock, caps lock, scroll lock, and the like. The keyboard 30a further includes a key function indicator 35 having several indicating elements, for example, LEDs (light emitting diodes). When one of the specific function key pads is struck, the keyboard 30a generates a corresponding key function signal, and at the same time a corresponding LED of the key function indicator 35 is enabled to be turned on. The LED elements are relatively high in power consumption as compared with the other elements of the keyboard 30a. Thus, when the keyboard 30a operates with wireless communication and by a battery voltage, the battery voltage is rapidly lowered due to, particularly, the key function indicator 35 having relatively high power-consumption LED elements.

As shown FIGS. 1 and 2, the mouse 40 is directly connected to the computer 20. In this case, if a user enters data into the computer 20 using the wireless keyboard 30a as shown in FIG. 2, it is very inconvenient for the user to use both the mouse 40 and the wireless keyboard 30a.

Figure 3:
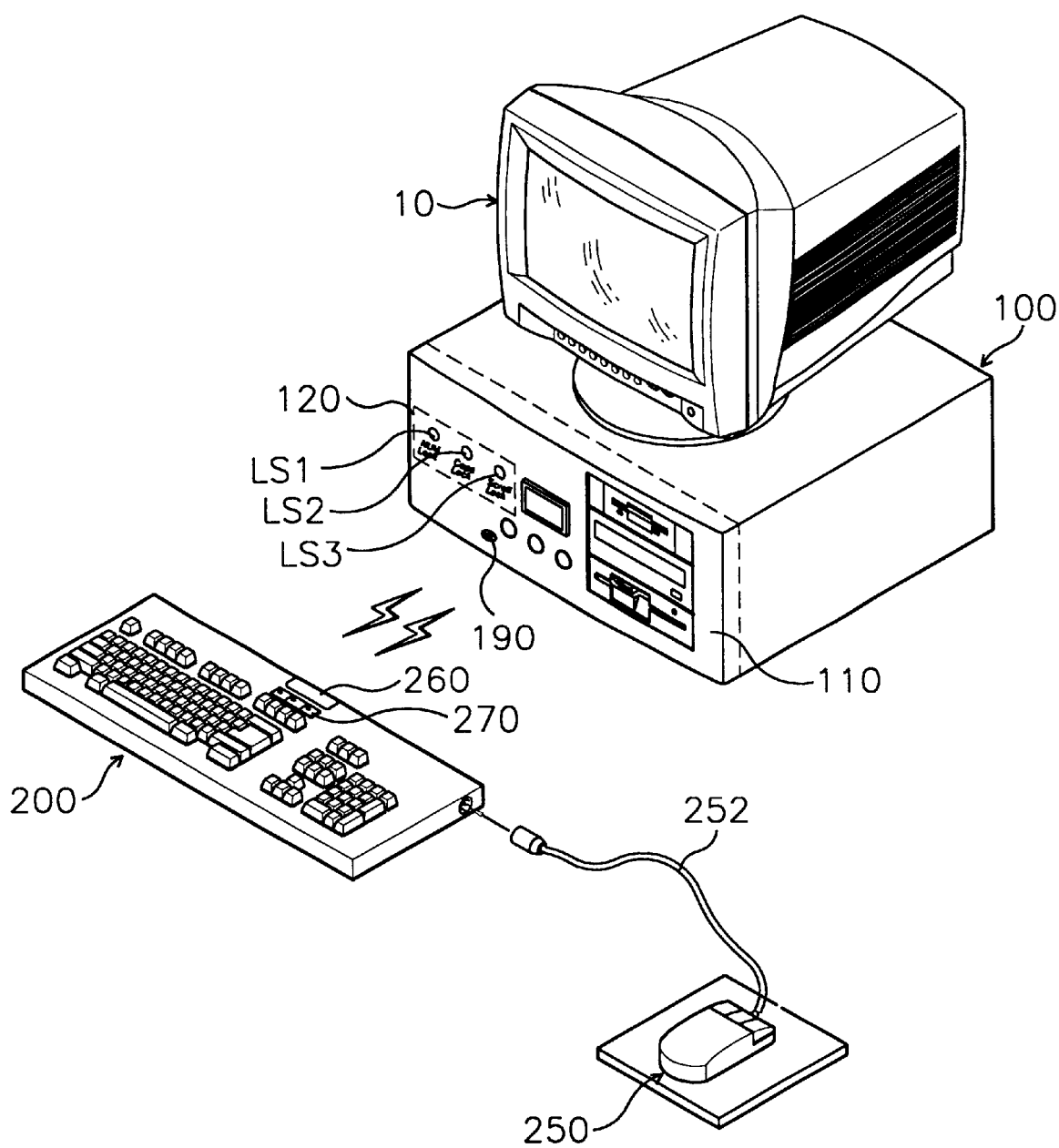
FIG. 3 is a perspective view of a computer system incorporating the present invention and having a wire/wireless keyboard and a pointing device removably attachable to the keyboard.
Figure 6:
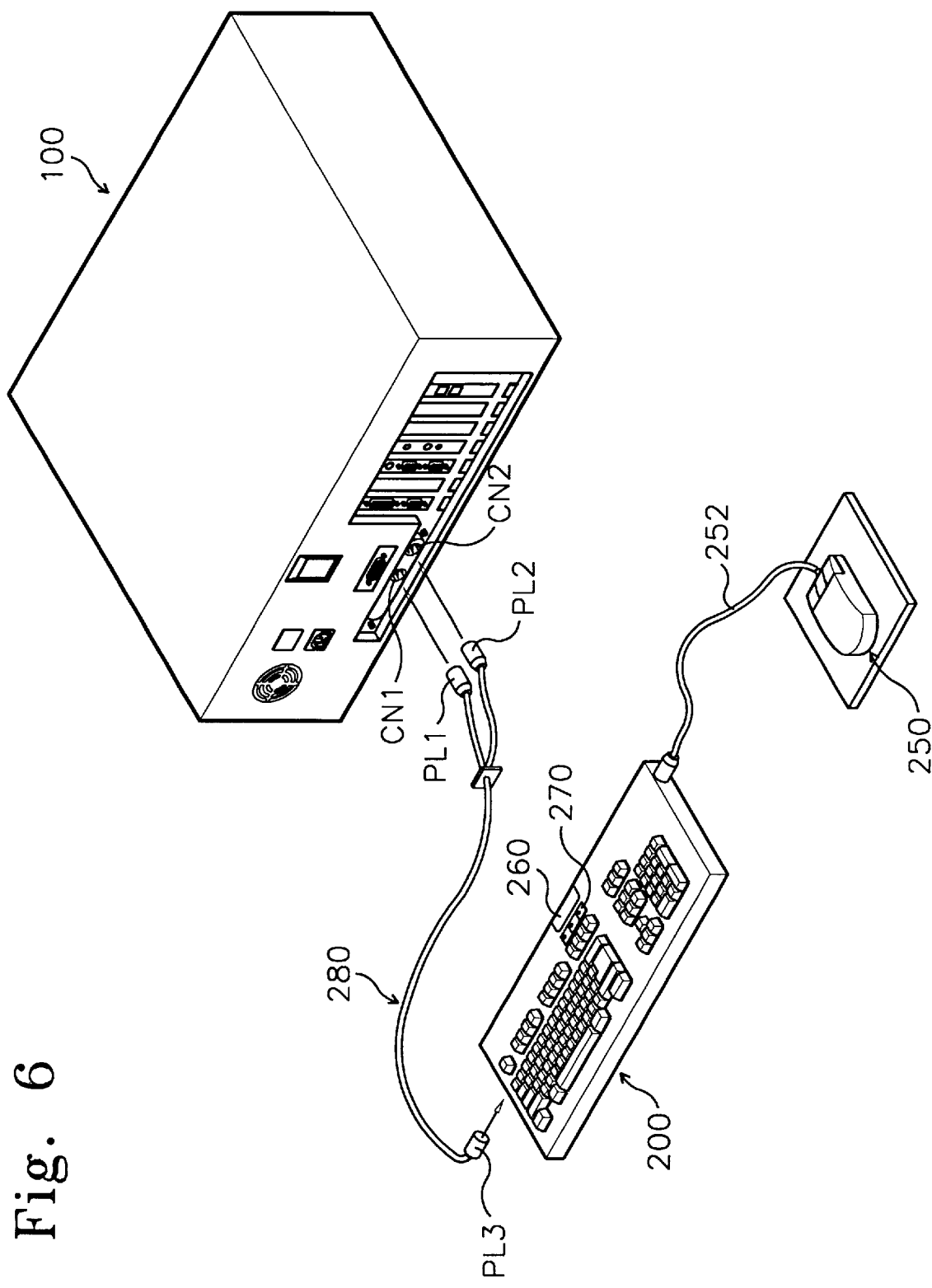
FIG. 6 is a detailed perspective view of the computer system to which the wire/wireless keyboard shown in FIG. 3 is connected through a cable.

Referring to FIGS. 3 and 6, a novel wire/wireless keyboard 200 according to the present invention has a connector with which a pointing device, for example, a mouse 250, is removably connected directly, so that output information of the pointing device 250 can be provided through the keyboard 200 to a computer 100 in wire or wireless form. The keyboard 200 also provides key input information, or example, commands and data, to the computer 100 in wire/wireless form. Hereinafter, wire and wireless communication mean that signal transmission between the keyboard 200 and the computer 100 is performed in wire and wireless form, respectively. The pointing device 250 may be a touch pad, a joy stick, a track ball, etc. in addition to the mouse. For simplicity, a mouse is hereinafter described as an example of the present invention to which a pointing device is adapted.

Referring again to FIG. 3, the wire/wireless keyboard 200 is connected through a cable 252 with the mouse 250, and an upper panel thereof has a set of keys, a key function indicator 270 and a driver 260 for transmitting information in wireless form (for example, as a light signal, an RF (radio frequency) signal or an infrared signal). The key function indicator 270 is provided to indicate which specific function keys, such as number lock, key caps lock key, and scroll key, are depressed.

As shown in FIG. 6, the keyboard 200 is also connectable through a cable 280 to the computer 100. An additional key function indicator 120 (FIG. 3) is mounted on a front panel 110 of the computer 100 so as to indicate which one of the specific function keys is depressed, as is the case with the key function indicator 270 provided on the keyboard 200. The indicator 120 has three LEDs (light emitting displays) as in the indicator 270. In this embodiment, the indicator 120 is located on the front vessel 10 of the computer 100, but it may be located on a front panel of a monitor 10. Also, two key function indicators may be located on both of computer 100 and the monitor 10.

When the wire/wireless keyboard 200 operates with wireless communication, or when it communicates with the computer 100 in wireless form, the key function indicator 270 on the keyboard 200 is turned off and the key function indicator 120 on the computer 100 is turned on. Thus, during wireless communication, it is possible to reduce power consumption of a battery (not shown in FIGS. 3 and 6) mounted in the keyboard 200. The battery may be a rechargeable battery.

Turning to FIG. 3, a reference numeral 190 indicates an infrared window which receives information transmitted by the driver 260 infrared signal to the computer 100. When the keyboard 200 operates with wireless communication, a corresponding LED of the key function indicator 120 on the computer 100 is turned on so as to indicate which specific function key is depressed. For example, the number lock function is indicated by a first LED element LS1, the caps lock function by a second LED element LS2, and the scroll lock function by a third LED element LS3.

Also, the mouse 250 can be connected to the keyboard 200 so as to remotely enter pointing information, and thereby the pointing information can be transmitted through the keyboard 200 to the computer 100. Herein, "pointing information" means pointer data for designating data manipulation by means of the mouse 250.

Figure 4:
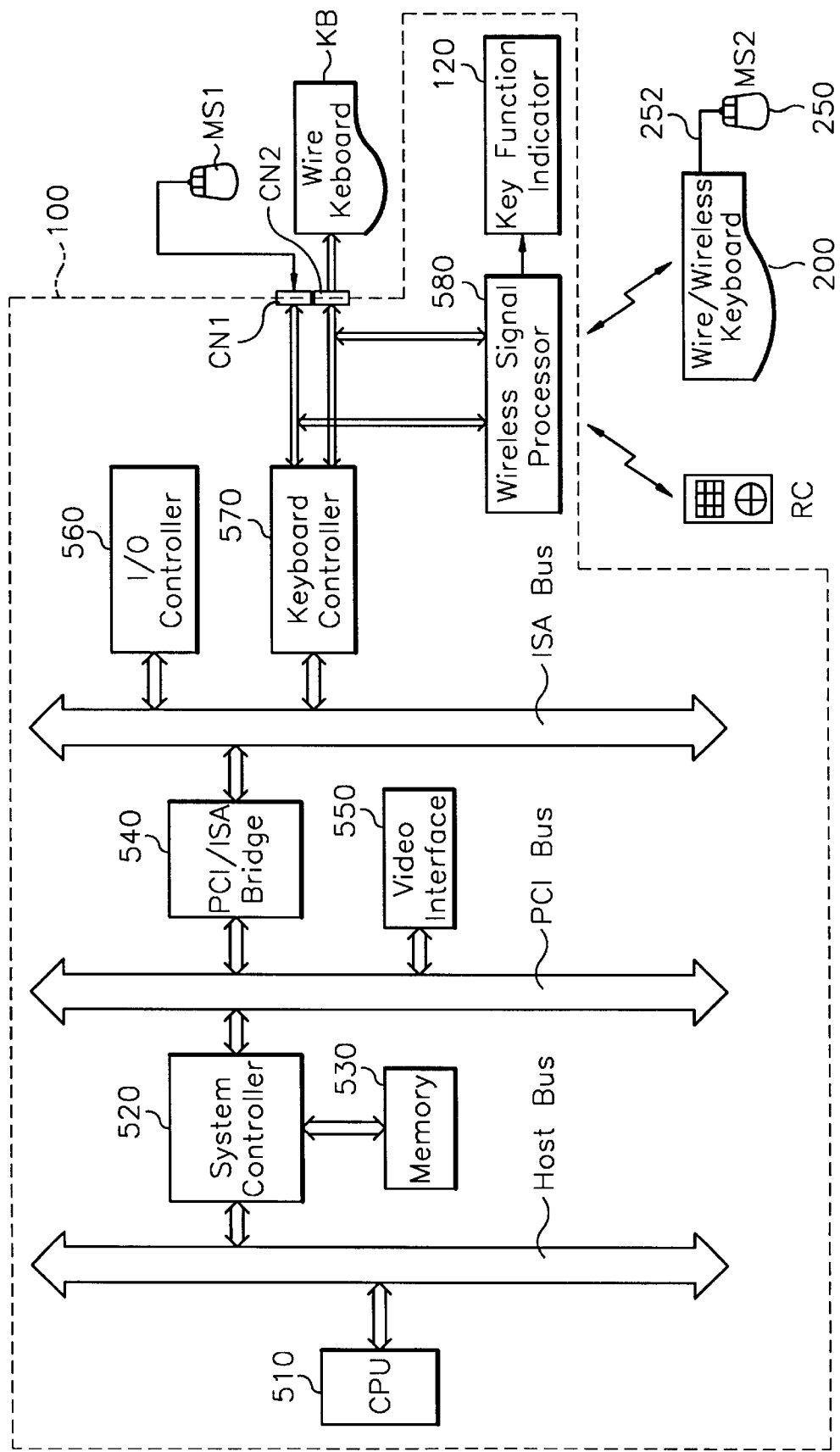
FIG. 4 is a block diagram showing a circuit of the computer system when the wire/wireless keyboard shown in FIG. 3 operates with wireless communication.

FIG. 4 shows a circuit of the computer 100 when the wire/wireless keyboard 200 operates with wireless communication. As shown in FIG. 4, a CPU (central processing unit) 510 is connected to a host bus so as to perform a data processing function. System controller 520 is provided to control data transmission between the host bus and PCI bus and to control access to a memory 530. Video interface 550 is connected with the PCI bus so as to display video data on the monitor. Keyboard controller 570 and I/O controller 560 are connected with an ISA bus so as to control data transmission between the computer 100 and its peripheral devices. The I/O controller 560 is provided to control data transmission between the CPU 510 and the peripheral devices, for example, a floppy disk driver, a hard disk driver, a CD-ROM driver, etc. The keyboard controller 570 is provided to control data transmission between the CPU 510 and the data input devices, for example, the mouse MS1 and the wire keyboard KB which are connected through cables to the connectors CN1 and CN2, respectively, of the computer 100.

Also, wireless signal processor 580 is connected to the keyboard controller 570 so as to control data transmission between the CPU 510 and a remote data input device, for example, a remote controller device RC, the wire/wireless keyboard 200, or the mouse 250 connected directly to the keyboard 200 via cable 252. Wireless signals from the remote data input device are processed by the wireless signal processor 580 to enter the processed data into the computer 100. Pointing data from the mouse 250 is transmitted through the wire/wireless keyboard 200 to the computer 100.

Figure 5:
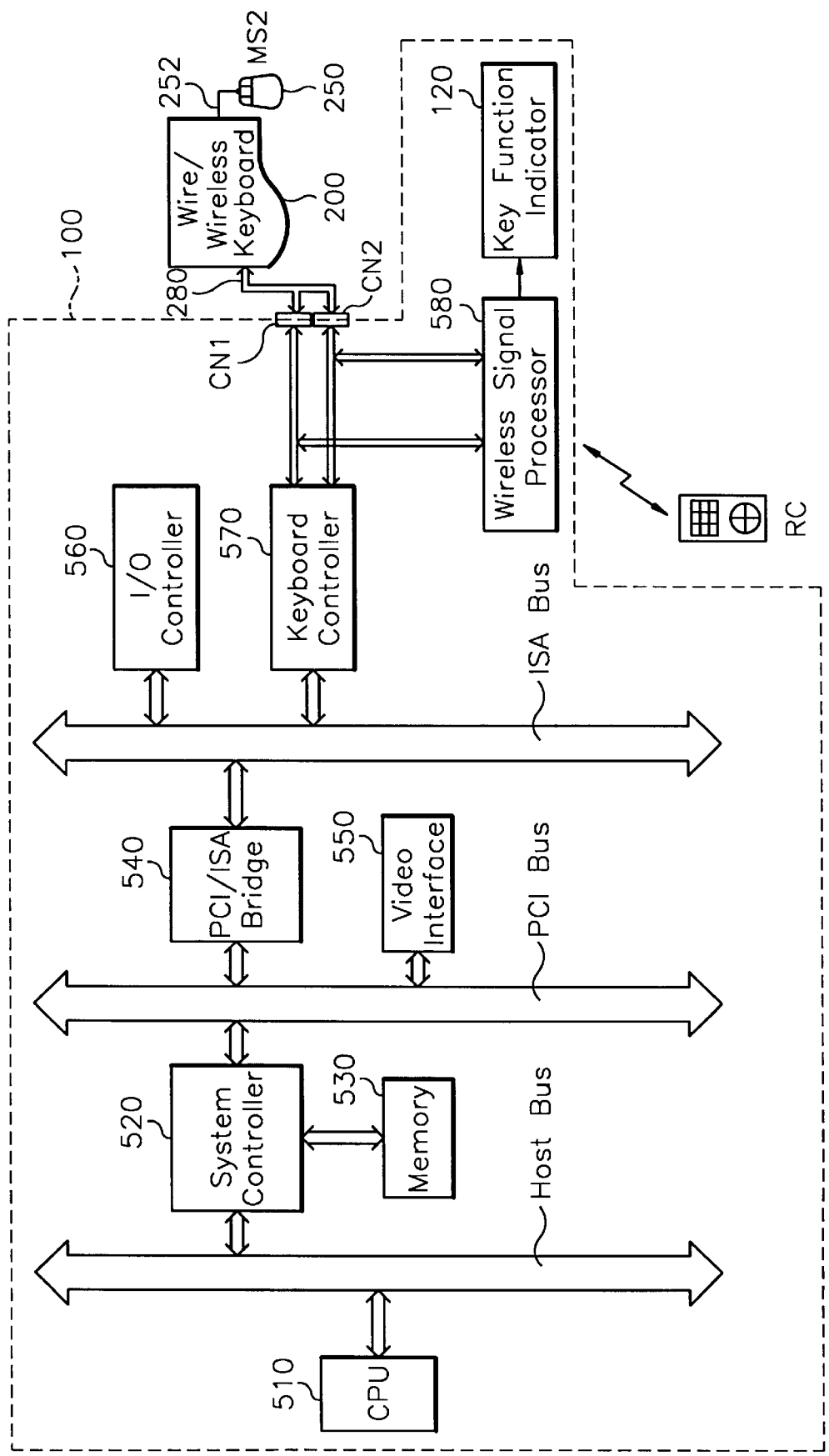
FIG. 5 is a block diagram showing the computer system circuit when the wire/wireless keyboard shown in FIG. 3 operates with wire communication.

FIG. 5 shows a circuit of the computer 100 when the wire/wireless keyboard 200 operates with wire communication. In this figure, a wire signal from the keyboard 200 or the mouse 250 is transmitted through the cable 280 to the computer 100. The computer 100 of FIG. 5 has the same composition as that of FIG. 4, and thus description thereof is omitted below.

FIG,. 6 shows that the keyboard 200 is connected through the cable 280 to the computer 100 so as to perform wire communication. The cable 280 has two ends, one of which is connected via a single plug PL3 to the wire/wireless keyboard 200, and the other of which is divided and connected to two plugs PL1 and PL2. These plugs PL1 and PL2 are connected to a keyboard input port CN1 and to a mouse input port CN2, respectively, of the computer 100. Through the cable 280, key input information from the wire/wireless keyboard 200 or pointing information from the mouse 250 is applied to the computer 100. An expanded view of the cable 280 is shown in FIG. 7A.

Figure 7B:
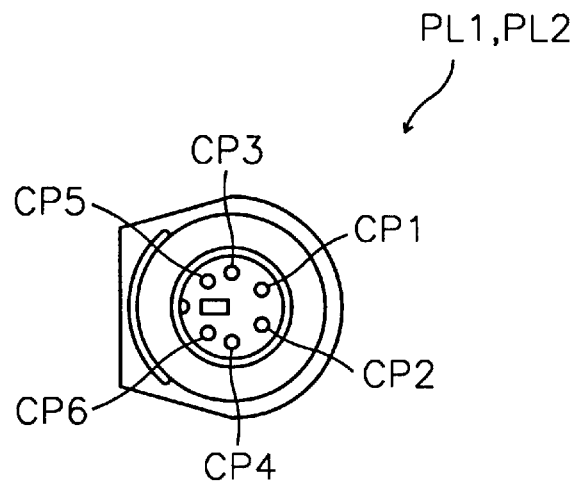
FIG. 7B is a front view of each of two plugs which are at one end of the cable and connected to the computer.
Figure 7C:
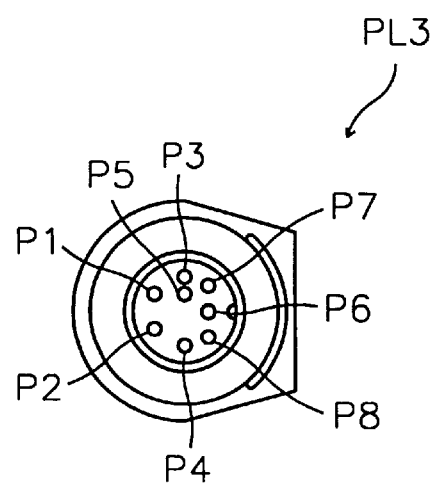
FIG. 7C is a front view of a plug which is at the other end of the cable and connected to the wire/wireless keyboard.

FIGS. 7B and 7C show the plugs PL1 (PL1) (PL3) and PL3. Each of the plugs PL1 and PL2 is comprised of a DIN plug having six pins CP1 through CP6 as shown in FIG. 7B. CP1 is a data transmission pin, (CP2 and CP6 are non-connection pins, CP3 is a ground pin, CP4 is a Vcc supply pin, and CP5 is a clock transmission pin. The plug PL3 has eight pins P1 through P8 as shown in FIG. 7C. The pins P1 through P4 are provided for the wire/wireless keyboard 200 and the pins P5 through P8 for the mouse 250. P1 and P5 are data transmission pins, P2 and P6 are clock transmission pins, P3 and P7 are ground pins, and P4 and P8 are Vcc supply pins.

Figure 8:
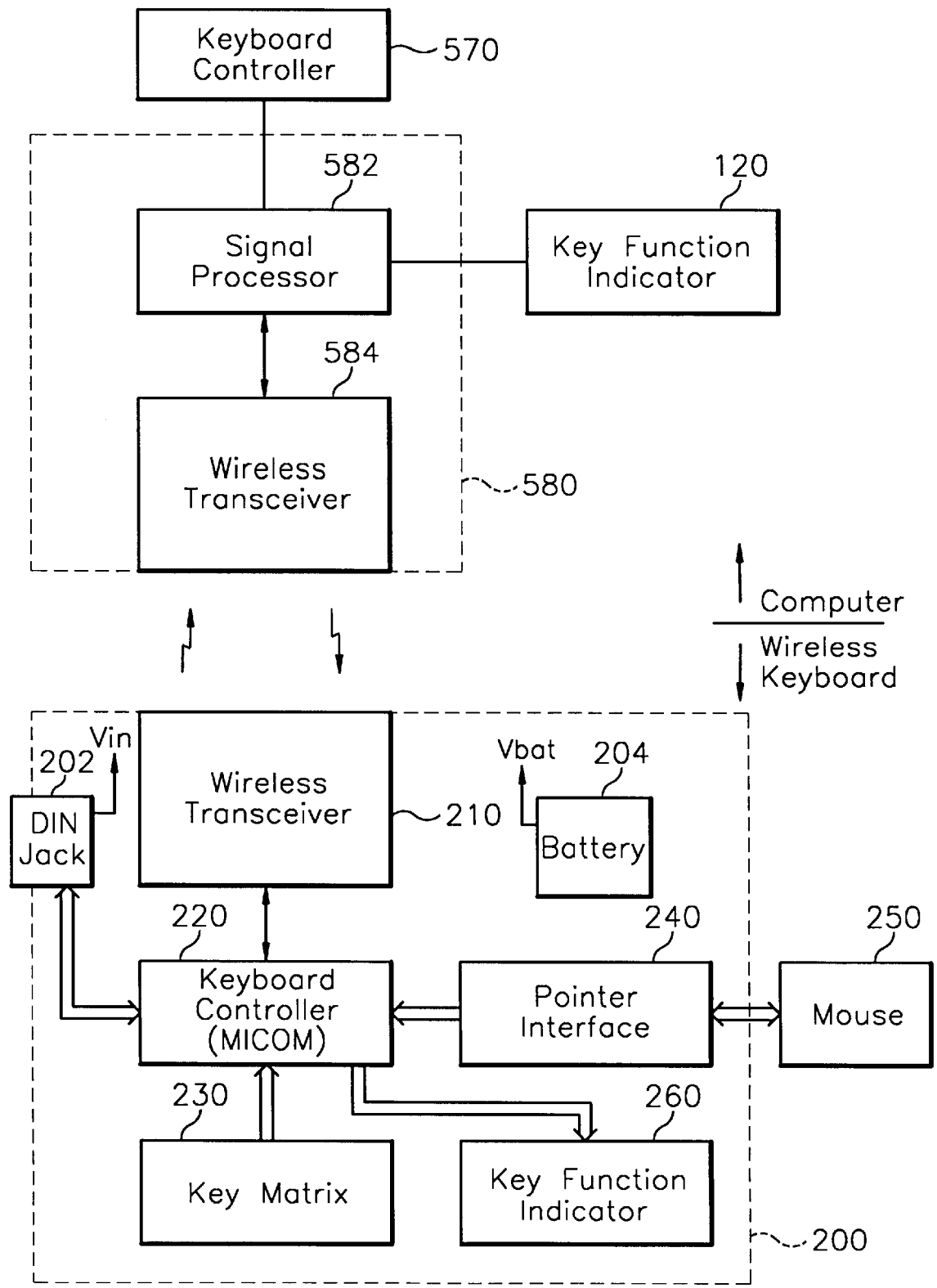
FIGS. 8 to 10 are circuit diagrams showing the combination of the wire/wireless keyboard and the computer system associated with the keyboard in accordance with three examples of the present invention.

FIG. 8 is a block diagram showing a circuit diagram of the combination of the wire/wireless keyboard and the computer system associated therewith. In this figure, the wire/wireless keyboard 200 has five main components: a key matrix 230, a wire/wireless keyboard controller 220, a wireless transceiver 210, a pointer interface 240 and a key function indicator 260. The keyboard controller 220 is substantially constituted by a microcomputer which is connected by a DIN jack 202 so as to communicate with the computer 100 through the cable 280. This DIN jack 202 is coupled with the DIN plug PL3 (refer to FIG. 6).

Referring again to FIG. 8, the key matrix 230 has a set of keys for entering data and commands. The keyboard controller 220 provides a scanning signal to the key matrix 230 and senses a signal corresponding to the key input. The sensed signal is provided to the wireless transceiver 210 and the DIN jack 202. Then, the wireless transceiver 210 converts the signal into a wireless signal, i.e., an infrared signal, and transmits the wireless signal to the computer 100. If the keyboard 200 is coupled via the cable 280 to the computer 100, it operates with a power source voltage applied from the computer 100: if not so coupled, or when the keyboard 200 operates with wireless communication, it operates with a battery voltage from a battery 204 which is located therein.

As mentioned above, when the power source voltage generated by a power supply (not shown) of the computer 100 is applied through the power supply pins Vcc and GND of the cable 280 to the keyboard 200, keyboard 200 can use the power source voltage firm the computer 100. This can be achieved by detecting whether the keyboard 200 is coupled through the plugs PL1 to PL3 to the computer 100. In detail, the wire/wireless keyboard controller 220 detects whether the DIN plug PL3 of the cable 280 connected to the computer 100 is inserted into the DIN jack 202. If the DIN plug PL3 is inserted into the DIN jack 202, the keyboard controller 220 allows the keyboard 200 to operate using the power source voltage applied through the power pins of the plug PL3, but not using battery voltage. This detection is substantially accomplished by the keyboard controller 220 operating with battery voltage from the battery 204; after detection, the keyboard controller 220 can operate with the power source voltage from the computer 100. Even though the DIN plug PL3 is inserted into the DIN jack 202, the keyboard controller 220 continues to operate with battery voltage.

Also, the keyboard controller 220 controls operations of the keyboard 200 in response to a control signal provided by the computer 100 through the wireless signal processor 580. The keyboard 200 senses a pointing signal generated from the mouse 250 through the pointer interface 240. The sensed pointing signal is converted into a wireless signal by means of the wireless transceiver 210, and is provided to the computer 100.

The wireless signal processor 580 of the computer 100 receives the wireless signal from the keyboard 200. The signal received through the wireless transceiver 584 is transformed into a preset format data and is provided to the keyboard controller 570 (refer to FIGS. 4 and 5) of the computer 100. Then, it is determined in the signal processor 582 whether the received signal is key input data from the keyboard 200, pointing data from the mouse 250, or data from the remote controller RC. If the received signal is key input data, the signal processor 582 determines whether the key input data is a signal corresponding to a specific key function. If so, the signal processor 582 generates a control signal to the key function indicator 120 so that the LEDs of the indicator 120 are turned on in response to the control signal.

Figure 9:
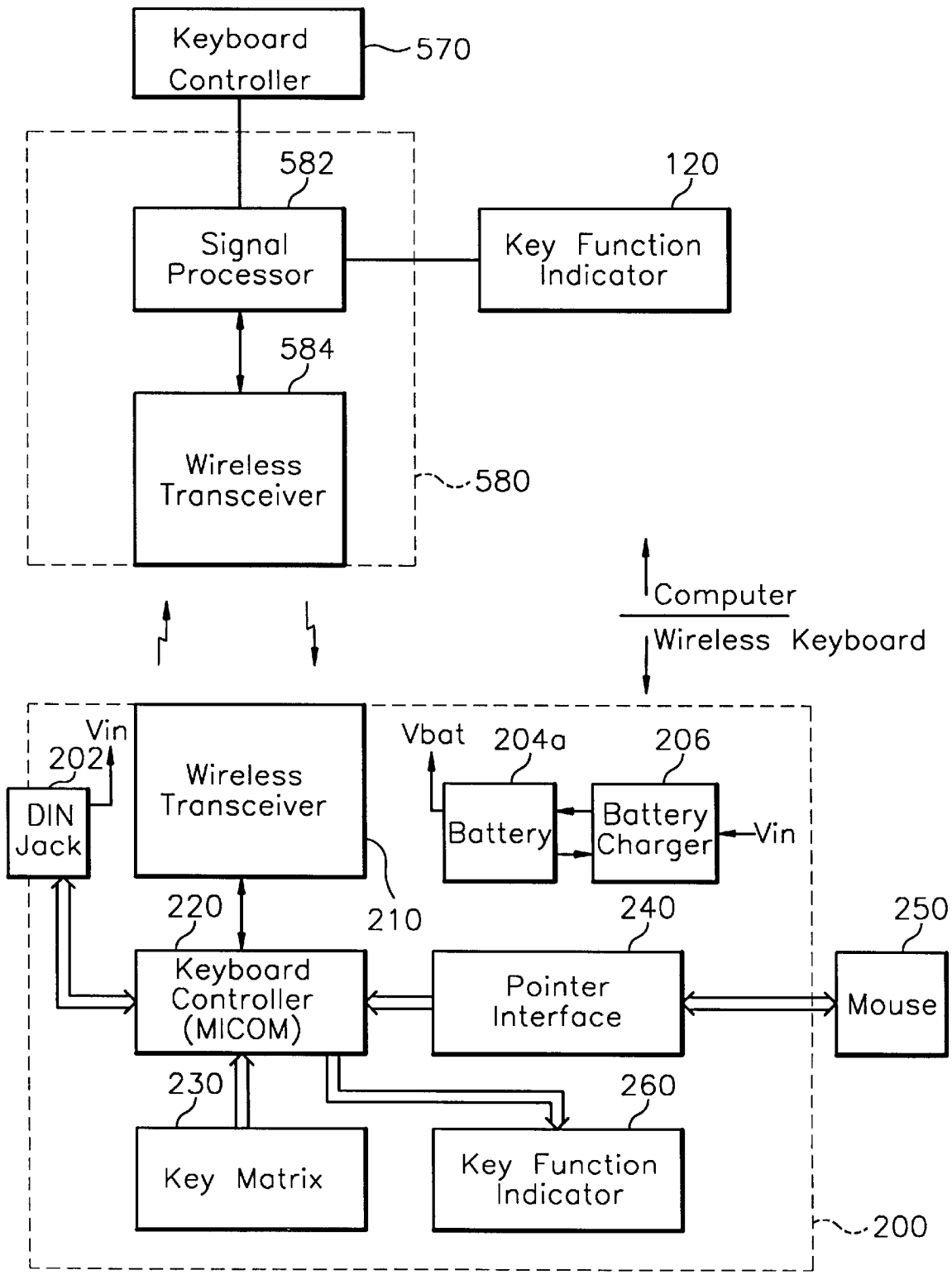

The circuit of FIG. 9 has the same construction as that of FIG. 8, except that a rechargeable battery 204a is used as the battery located in the keyboard 200 and a battery charger (or battery charging circuit) 206 is further included in the circuit of FIG. 8. Accordingly, description of components identical to those in FIG. 8 is omitted.

As shown in FIG. 9, when the keyboard 200 operates with a power source voltage Vin from the computer 100 by connecting the keyboard to the computer 100 through the cable 280, the rechargeable battery 204a is charged by means of a battery charger 206 receiving the voltage Vin. If the keyboard 200 does not operate with the power source voltage Vin from the computer 100, it operates with the battery voltage from the rechargeable battery 204a. If the power source voltage Vin from the computer 100 is supplied, however, the keyboard 200 operates with the voltage Vin and, at the same time, the battery 204a is charged.

Figure 10:
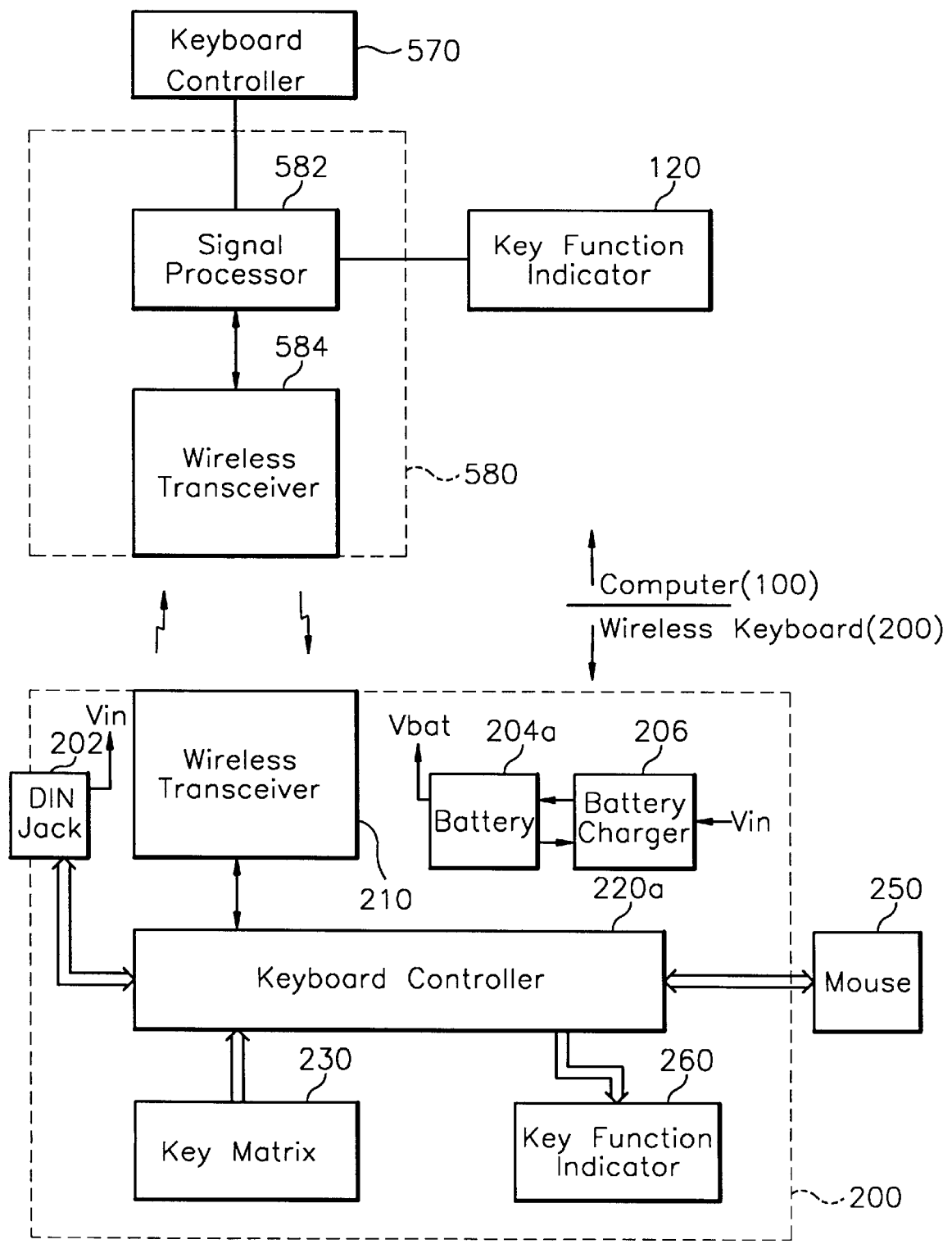

The circuit of FIG. 10 has the same construction as that of FIG. 9 except that a wire/wireless keyboard controller 220a incorporates an interfacing function capable of processing pointing data provided directly from the mouse 250, and thus description of identical components is omitted. In the circuit of FIG. 10, an additional pointer interface is not provided for the mouse 250.

On the other hand, even though an additional key function indicator is located on a front panel of the monitor, the indicator can be turned on/off in response to the control signal which is generated from the signal processor 582 of FIGS. 7 to 10 and supplied from the computer 100 to the monitor. Accordingly, even a monitor can display a specific key function.

In FIGS. 8 to 10, it is shown that the mouse is connected directly to the wire/wireless keyboard controller 220a or the pointer interface 240, but the direct connection therebetween is accomplished through the plug and jack serving as PS2 connector, as in FIGS. 7A and 7B.

Figure 11A:
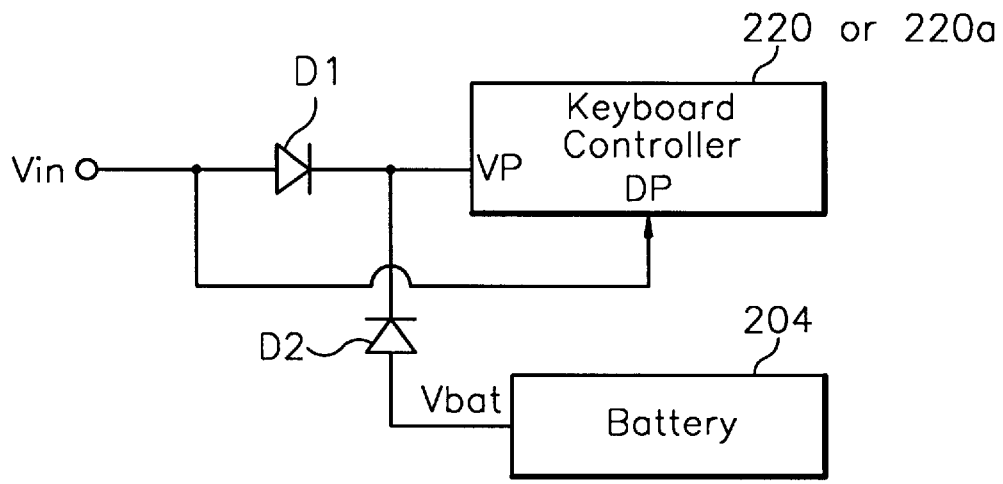
FIGS. 11A and 11B are circuit diagrams showing that the controller of the keyboard detects whether a power source voltage is supplied from either a battery or the computer.
Figure 11B:
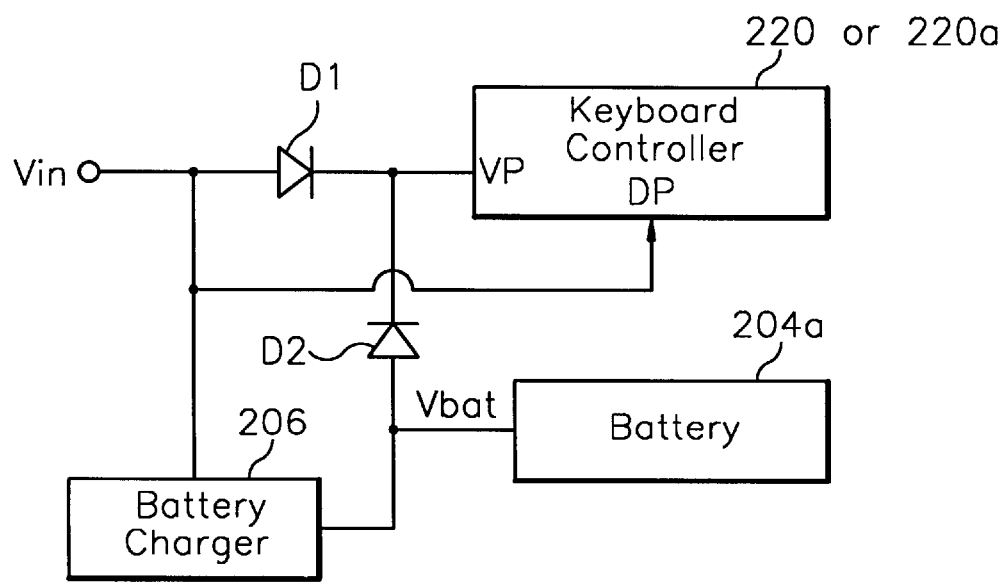

FIGS. 11A and 11B show that the controller 220 or 220a of the keyboard detects whether a power source voltage is supplied from either a battery or the computer. It is shown, particularly, in FIG. 11B, that the battery 204a may be charged by the battery charger 206. In FIGS. 11A and 11B, a power source voltage Vin supplied from the computer 100 is applied through a diode D1 to a power terminal VP of the keyboard controller 220 or 220a, and directly to a power detection terminal DP thereof. A battery voltage Vbat from the battery 204 or 204a is supplied through a diode D2 to the power terminal VP. Particularly, in FIG. 11B, the power source voltage Vin is also supplied through the battery charger 206 to the battery 204a. Thus, the keyboard controller 220 or 220a can detect whether the voltage Vin is supplied through the power detection terminal DP.

Figure 12:
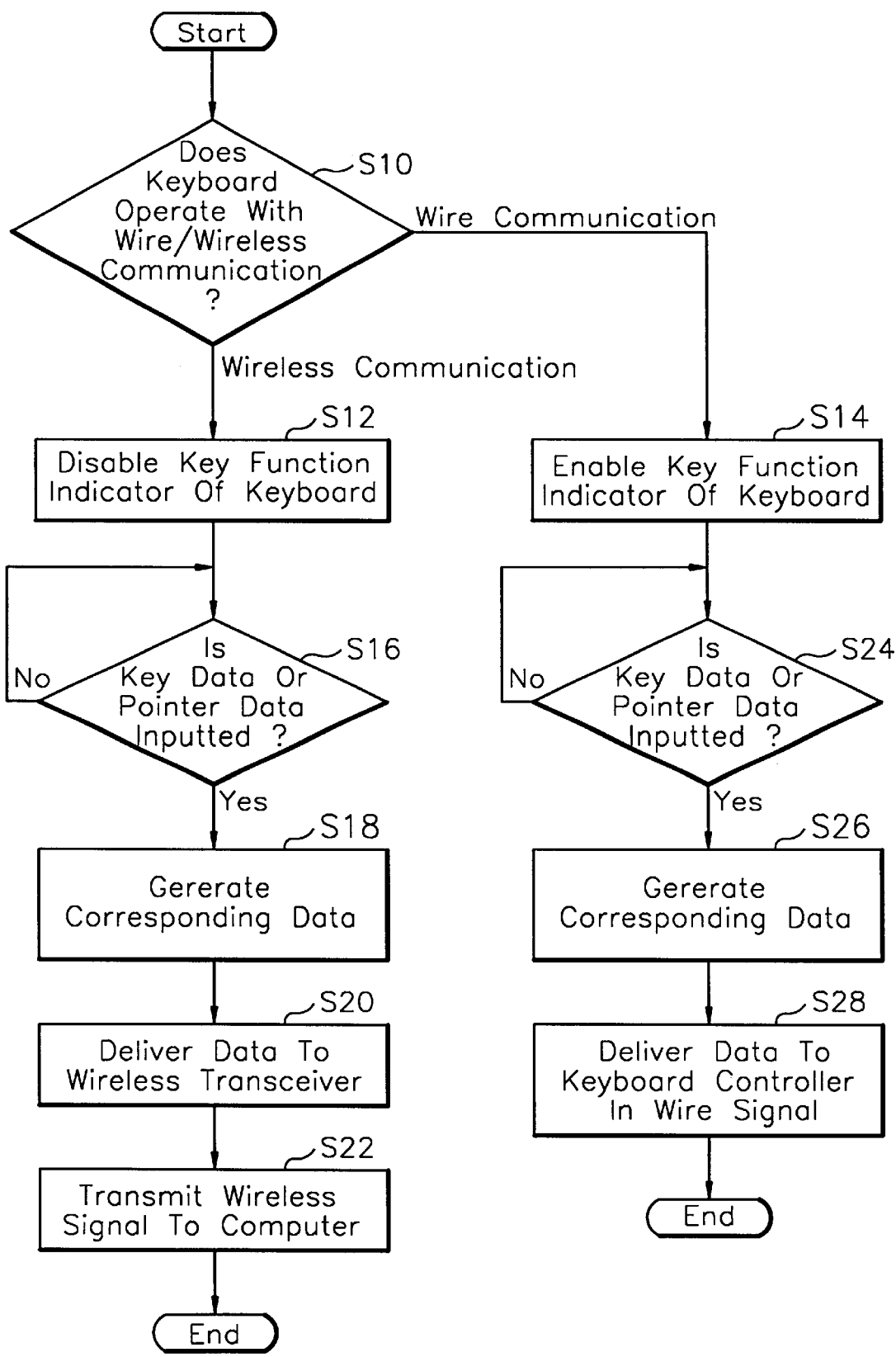
FIG. 12 is a flow chart showing a program to be performed in the wire/wireless keyboard shown in FIG. 3.

Hereinafter, operations of the wire/wireless keyboard and the computer associated therewith according to the present invention will be described with reference to FIGS. 11 and 12. The flow chart shown in FIG. 12 is a control program to be performed in the keyboard controller 220 or 220a of the keyboard 200.

At step S10, the keyboard controller 220 or 220a determines that the keyboard 200 operates with wire or wireless communication by detecting whether or not a power source voltage Vin from the computer 10 is applied to the power detection terminal DP of the keyboard controller 220 or 220a. If the keyboard 200 operates with wire communication, the control proceeds to step S14 and, if it operates with wireless communication, the control proceeds to step S12. At step S14, the key function indicator 260 on the keyboard 200 is enabled to be turned on so that a specific key function can be displayed when a specific function key is depressed, and the control proceeds to step S24 wherein it is determined whether a key input data from the keyboard 200 or pointing data (or pointer data) from the mouse 250 is inputted. At step S24, if data is inputted, the control proceeds to step S26 wherein a corresponding data (i.e., a key code or a pointing information) is generated. After generation of the corresponding data, the control proceeds to step S28 wherein the data is delivered through the cable 280 to the keyboard controller 570 of the computer 100.

On the other hand, at step S12, the key function indicator 260 of the keyboard 200 is disabled. Then, even though a specific function key is depressed, a specific key function is not displayed by the indicator 260. This is because the indicator 260 is turned off. The control proceeds to step S16 wherein it is determined whether a key input data from the keyboard 200 or a pointing data from the mouse 250 is inputted. At step S16, if data is inputted, the control proceeds to step S18 wherein a corresponding data (i.e., a key code or a pointing information) is generated. After (generation of the corresponding data, the control proceeds to step S20 wherein the data is delivered to the wireless transceiver 210. Then, the transceiver 210 converts the data thus delivered into a wireless signal, for example, a radio frequency signal, an infrared signal or an optical signal. The control proceeds to step S22 wherein the wireless signal thus converted is transmitted to the computer 100.

Figure 13:
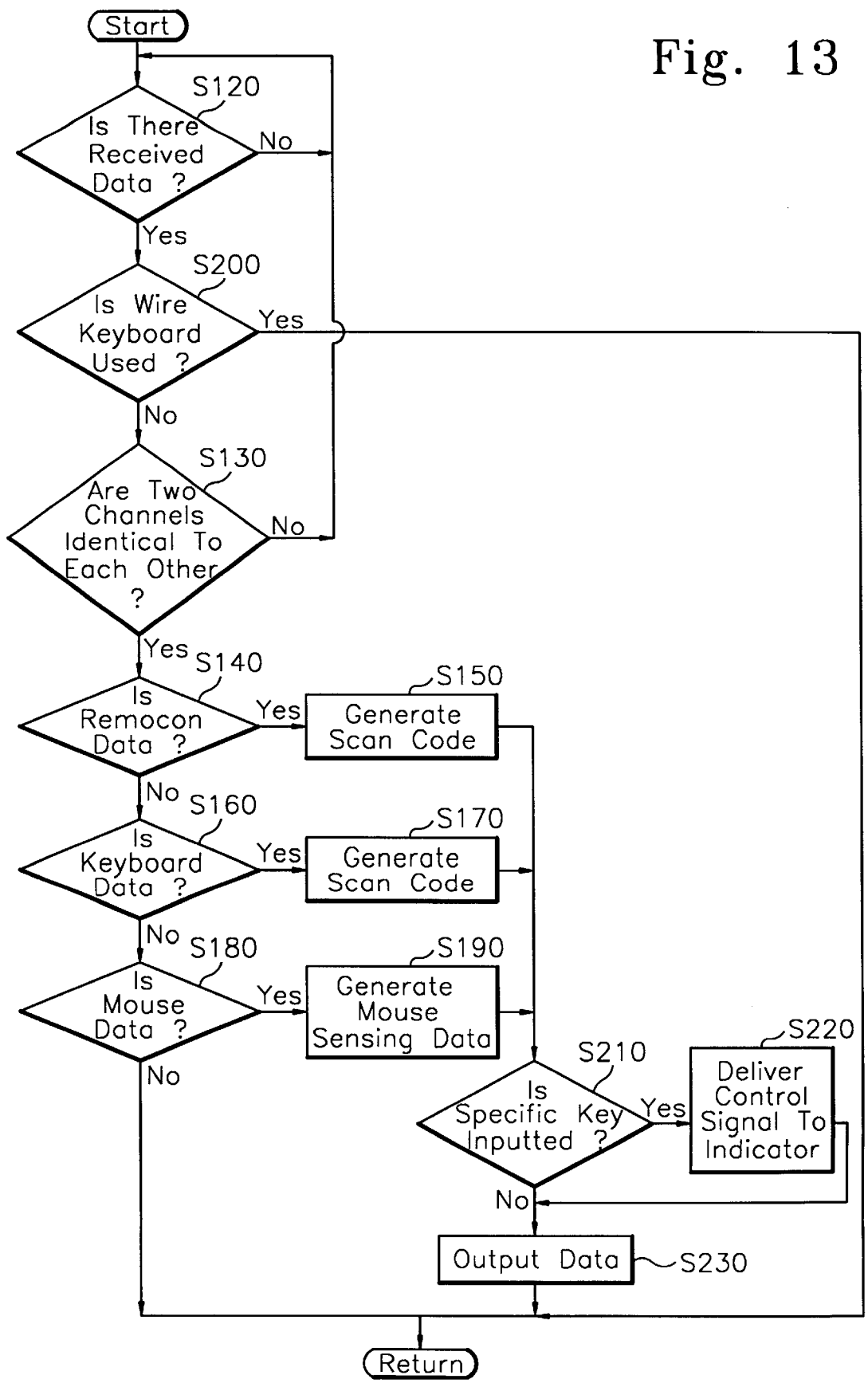
FIG. 13 is a flow chart showing a program to be performed in the signal processing unit of the computer associated with the keyboard.

The transmitted wireless signal is received and processed by the wireless signal processor 580 of the computer 100. The received wireless signal is converted into an electrical signal by means of the wireless transceiver 584 of the processor 580, and is then delivered to the signal processor 582 to be processed in accordance with the control program shown in FIG. 13.

At step S120, the signal processor 582 determines whether or not there is received data. If there is received data, the control proceeds to step S200 wherein it is checked whether a wire keyboard is used. At step S200, if a wire keyboard is not used, the control proceeds to step S130 wherein it is checked whether a channel (i.e., a frequency) of the transmitted signal is identical to a channel (i.e., a frequency) of the received signal. If so, the control proceeds to step S140 wherein it is determined whether the transmit-ted signal is provided from the remote controller RC. If so, at step S140, the control proceeds to step S150 wherein a scan code for the remote controller RC is generated. If not, at step S140, the control proceeds to step S160 wherein it is determined whether the transmitted signal is provided from the keyboard 200. At step S160, if so, the control proceeds to step S170 wherein a scan code for the keyboard 200 is generated. At step S160, if not, the control proceeds to step S180 wherein it is determined whether the transmitted signal is provided from the mouse 250. At step S180, if so, the control proceeds to step S190 wherein a mouse sensing data is generated.

At steps S150, S170 and S190, after generating the scan codes and the mouse sensing data, the control proceeds to step S210 wherein it is determined whether a specific function key is depressed. If so, the control proceeds to step S220 wherein a control signal is delivered to the key function indicator. The control signal is used to enable the key function indicator 120 of the computer 100 to display a corresponding specific key function. If a specific function key is not depressed at step S210, the control proceeds to step S230 wherein the scan code or data thus generated is delivered to the keyboard controller 570 of the computer.

As described immediately above, when the wire/wireless keyboard 200 operates with wire communication, it operates with the power source voltage from the computer 100 and the key function indicator of the keyboard is enabled to display a specific key function. And when the keyboard 200 operates with wireless communication, it operates with the battery voltage from the battery located therein, and the key function indicator of the computer or the monitor is enabled to display a specific key function. Accordingly, when the keyboard 200 operates with wireless communication, since the key function indicator thereof is disabled and the key function indicator is of the computer or the monitor is enabled, power consumption of the battery can be reduced considerably.

Also, since the keyboard 200 can be connected directly to a pointing device, such as a mouse, etc., pointing data can be delivered to the computer 100 in wire or wireless signal.

Figure 14:
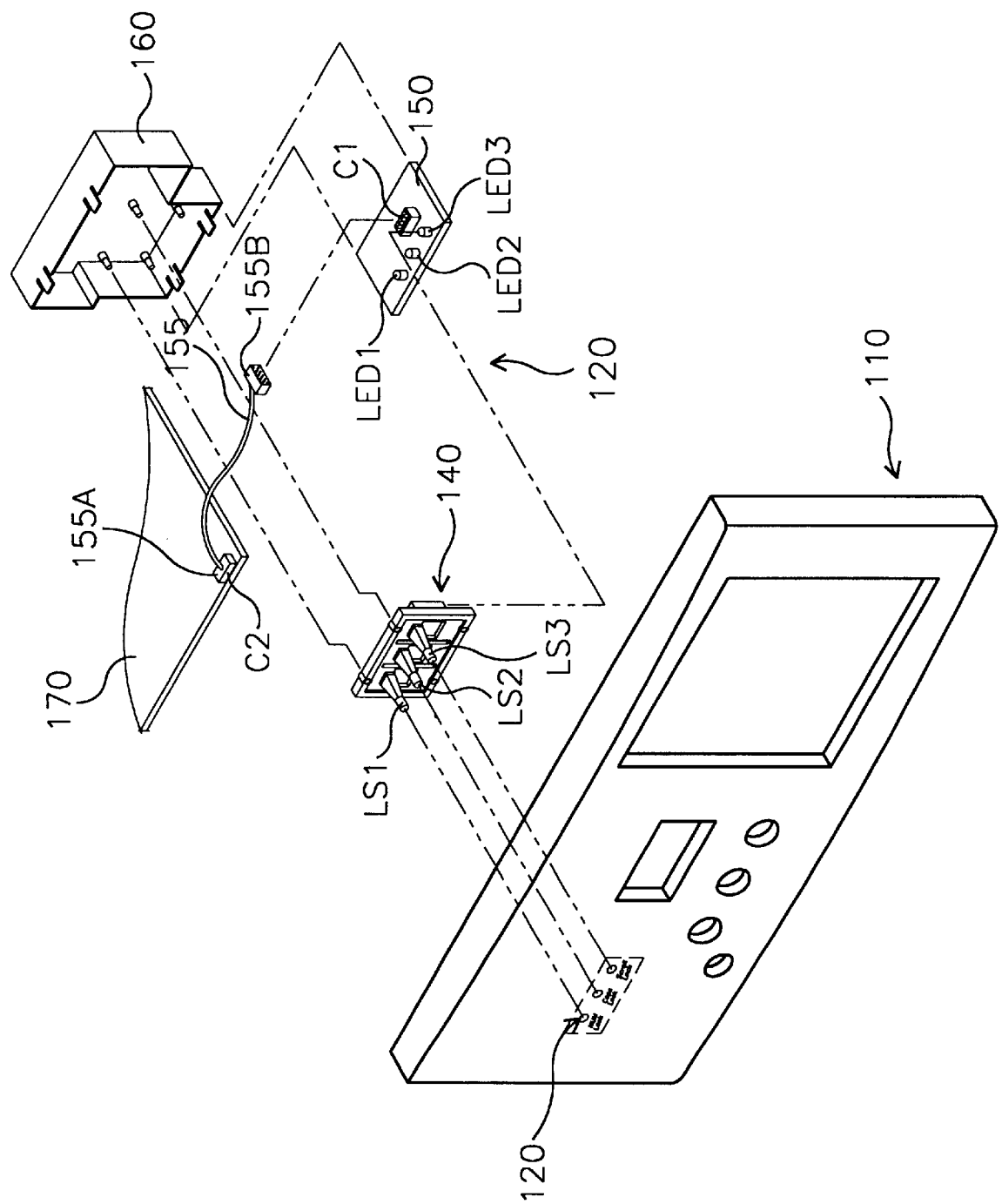
FIG. 14 is an exploded perspective view showing an inside structure of the computer having a key function indicator controlled by the keyboard.

FIG. 14 shows an inside structure of the computer 100 having the key function indicator 120 controlled by the keyboard. In this figure, the key function indicator 120 may indicate a number lock function, a caps lock function and a scroll lock function.

As shown in FIG. 14, the key function indicator 120 is located on a front panel 110 of the computer 100. LED board 150, constituting an electrical circuit of the key function indicator 120, is electrically connected with a computer main board 170 inside the computer 100. The LED board 150 receives a control signal from the wireless signal processor 580 mounted on the main board 170. The control signal is used to allow the keyboard 200 to display a specific key function. The LED board 150 is provided with a connector C1 for connecting with a connector C2 of the main board 170. The LED board 150 and the main board 170 are connected with each other by a cable 155 having sockets 155A and 155B at both ends thereof. The LED board 150 receives the control signal from the wireless signal processor 580 on the main board 170.

So as to emit lights generated from LEDs LED1 to LED3 of the LED board 150 outside of the computer, the LED board 150 has a tens portion 140 having three LED receiving members LS1 to LS3 for receiving the LEDs respectively. There is no interference between the LED receiving members LS1 to LS3 and the light generated by the LEDs.

Figure 15:
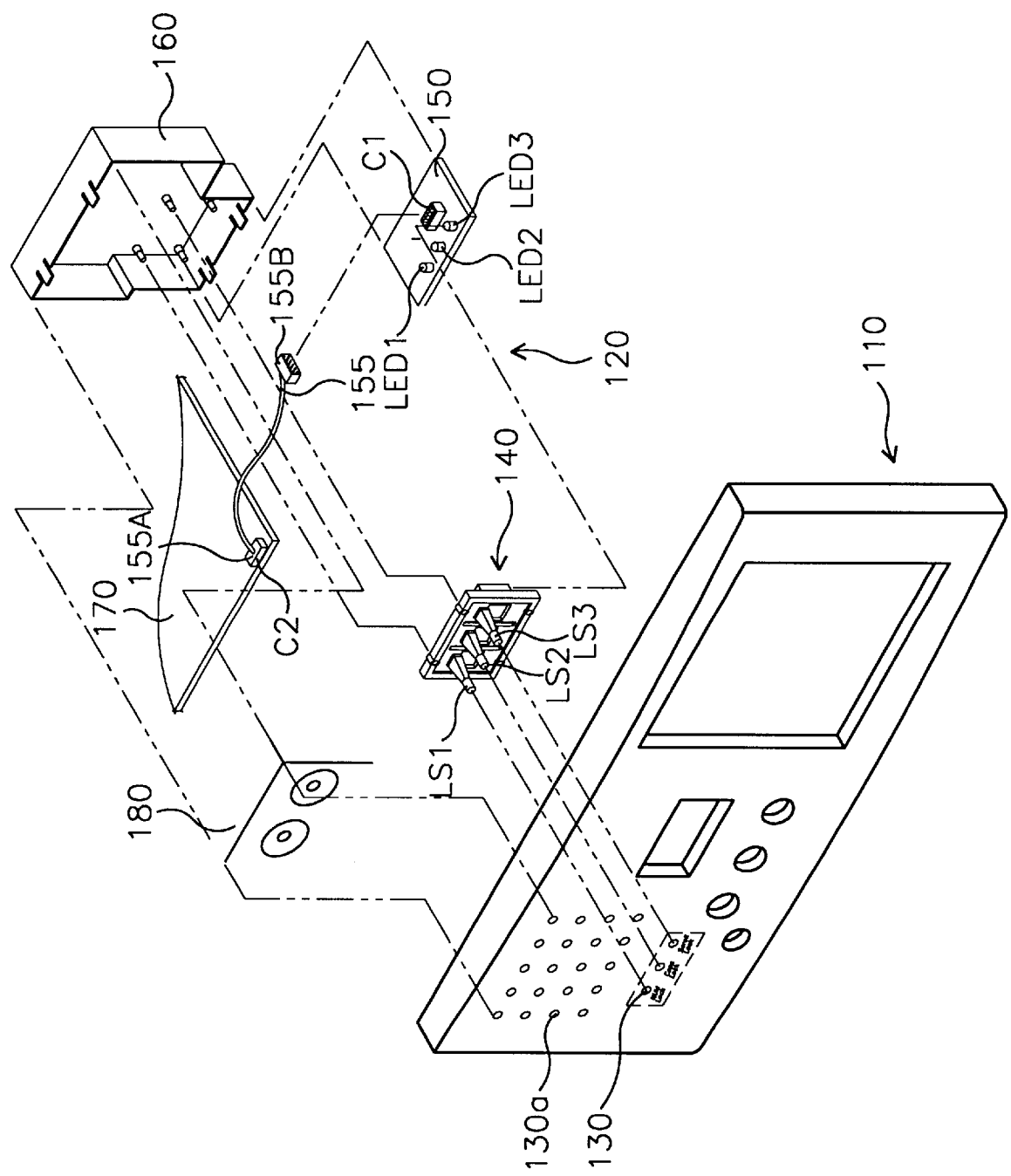
FIG. 15 is an exploded perspective view showing an inside structure of the computer having a key function indicator and a speaker phone.

As shown in FIG. 15, the LED receiving members LS1 to LS3 are projected outward through holes 130 on the front panel 110, and mounted to the computer by a supporting case 160 which supports the LED board 150 and the lens portion 140.

Figure 16:
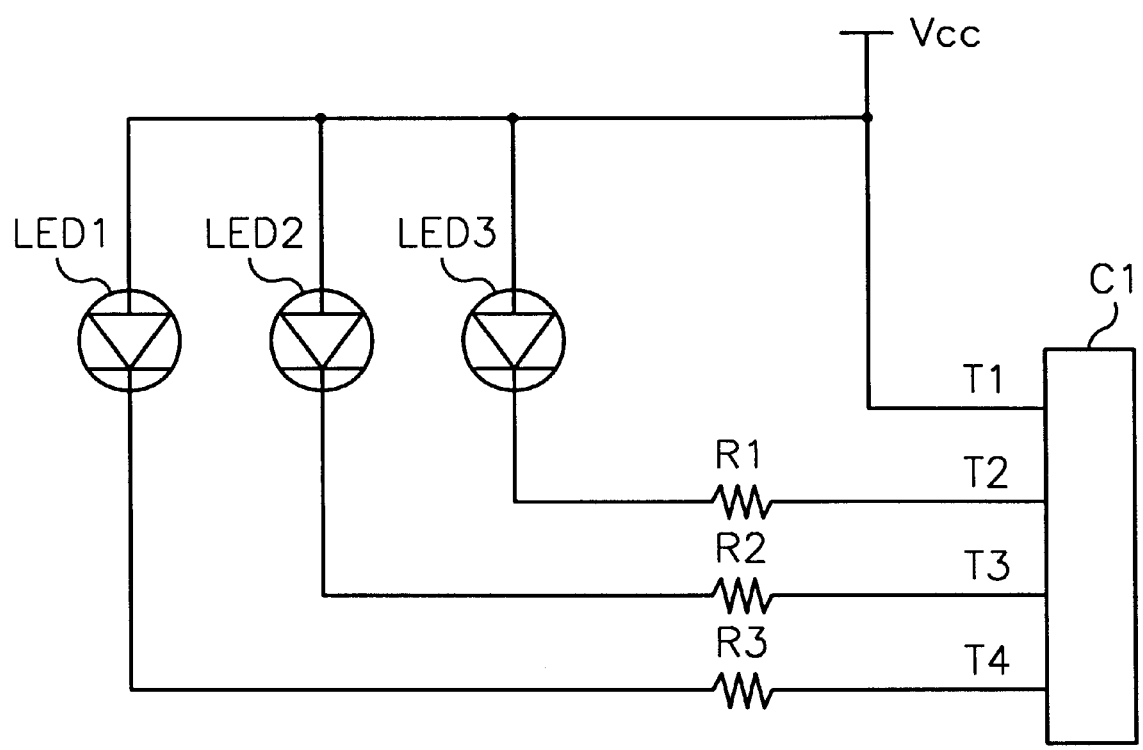
FIG. 16 is a detailed circuit diagram of the key function indicator.

FIG. 16 is a detailed circuit diagram of the key function indicator 120. In this figure, the indicator 120 has three LEDs corresponding to the number, caps and scroll lock functions. A power source voltage Vcc is commonly applied to anodes of the LEDs LED1 to LED3. Cathodes of the LEDs are connected through resistors R1 to R3 to terminals T2, T3 and T4 of the connector C1. When the control signal of low level from the signal processor 582 of the computer 100 is applied to the terminal T2, T3 or T4 of the connector C1, an LED is turned on. So, when a specific function key of the keyboard is depressed, a corresponding specific key function is indicated by the turned-on LED. The terminals T1–T4 of the connector C1 are connected to the wireless signal processor 580.

The structure of FIG. 15 has the same composition as that of FIG. 14 except that FIG. 15 includes a speaker phone 180 and a number of holes 130a therefor are provided on the front panel 110. Further description thereof is omitted herein.

As described above, a keyboard according to the present invention operates with a power source voltage from a computer during wire communication and allows a key function indicator on the keyboard to be enabled. Also, the keyboard operates with battery voltage from a battery located therein during wireless communication, and allows the key function indicator on the keyboard to be disabled and an additional key function indicator on the computer and/or a monitor to be enabled. Thus, when a specific function key is depressed during wireless communication, the key function indicator on the computer is turned on to display a corresponding specific key function. During wireless communication between the keyboard and the computer, since the keyboard operates with the battery voltage but the key function indicator on the keyboard does not operate, power consumption of the battery can be reduced considerably.

In addition, since the keyboard can be connected directly to a pointing device, such as a mouse, etc., pointing data from the pointing device can be delivered to the computer in a wire signal or a wireless signal. Accordingly, whenever the keyboard operates with wireless communication, it is very convenient for a user to use the pointing device as well as the keyboard.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A wire/wireless keyboard for use with a computer system and allowing wire/wireless communication of the keyboard with the computer system, comprising:

battery means for supplying a power source voltage for the keyboard;

a key matrix having a set of keys for,generating a key code corresponding to a depressed key;

key function indicator means for indicating a key function state corresponding to a depressed specific function key;

controller means for selectively controlling the key code to be transmitted to the computer system by one of wire communication and wireless communication; and wireless transceiver means for converting the key code into a wireless signal and for transmitting the wireless signal to the computer system, wherein the key function indicator means is disabled when the key code is transmitted by wireless communication.

2. The wire/wireless keyboard according to claim 1, wherein the wireless signal from the wireless transceiver comprises one of a radio frequency signal, an infrared signal and a light signal.

3. The wire/wireless keyboard according to claim 1, wherein the keyboard further comprises a pointer interface circuit for interfacing a pointing device with the keyboard.

4. The wire/wireless keyboard according to claim 1, wherein said battery means comprises a rechargeable battery, and the keyboard further comprises a battery charging circuit for charging the rechargeable battery using a power source voltage received from the computer system.

5. The wire/wireless keyboard according to claim 1, wherein said key function indicator means comprises at least one light source for emitting a light indicative of the depressed function key.

6. The wire/wireless keyboard according to claim 1, wherein said keyboard further comprises a cable for electrically connecting the keyboard to the computer system, and wherein said cable has a first plug at one end of said cable connected to a first connector of the keyboard and second and third plugs at another end of the cable, said second and third plugs being connected to second and third connectors, respectively, of the computer system.

7. The wire/wireless keyboard according to claim 6, wherein said second and third plugs are connected to a keyboard port and a mouse port, respectively, of the computer system.

8. The wire/wireless keyboard according to claim 1, wherein said battery means comprises a rechargeable battery and a battery charger connected thereto.

9. A computer system, comprising:

a data input device which includes a set of keys; and a computer having key function indicator means provided thereon for indicating a key function state corresponding to a depressed specific function key;

said computer having a front panel on which the key function indicator means is disposed;

wherein said data input device comprises a keyboard having the capability of both wire and wireless communication with said computer;

wherein said data input device generates a key code corresponding to a depressed key;

wherein said system further comprises a wireless signal transceiver which converts the key code into a wireless signal and transmits the wireless signal to said computer; and wherein said key function indicator means is disabled when said key code is converted to a wireless signal and said wireless signal is transmitted to said computer.

10. The computer system according to claim 9, wherein said data input device includes a rechargeable battery and a battery charger connected thereto.

11. The computer system according to claim 9, wherein said data input device further comprises a pointing device connectable to said keyboard for performing a data operation.

12. A computer system having a computer and a first data input device allowing wire/wireless communication with the computer, said first data input device comprising:

battery means for supplying a power source voltage for the first data input device;

a key matrix having a set of keys for generating a key code corresponding to a depressed key;

first key function indicator means for indicating a key function state corresponding to a depressed key;

first controller means for selectively controlling the key code to be transmitted to the computer by one of wire communication and wireless communication; and first wireless transceiver means for converting the key code into a wireless signal and transmitting the wireless signal to the computer;

said computer comprising:

second key function indicator means for indicating the key function state corresponding to the depressed key; and second controller means for receiving the wireless signal from the first wireless transceiver means and for determining whether the received wireless signal corresponds to one of specific function keys to generate a control signal;

wherein the first key function indicator means is disabled when the key code is transmitted by wireless communication; and wherein the second key function indicator means is enabled when the received wireless signal corresponds to said one of the specific function keys.

13. The computer system according to claim 12, wherein said second controller means comprises a second transceiver for converting the wireless signal from the first wireless transceiver means into a converted signal, means for generating a scanning code pointing signal corresponding to the converted signal, means for determining whether the converted signal corresponds to said one of the specific function keys, and means for generating the control signal when the wireless signal thus received corresponds to said one of the specific function keys.

14. The computer system according to claim 12, wherein said first data input device further comprises a pointer interface circuit for interfacing a second data input device, and wherein said first controller means allows one of wire and wireless transmission of one of a pointing signal from the pointer interface circuit and a key code to the computer system.

15. The computer system according to claim 12, wherein said battery means comprises a rechargeable battery, and the first data input device further comprises a battery charging circuit for charging the rechargeable battery using a power source voltage from the computer system.

16. The computer system according to claim 12, wherein said first data input device comprises a wire/wireless keyboard and said system includes a second data input device which comprises a pointing device.

17. The computer system according to claim 12, wherein said battery means comprises a rechargeable battery and a battery charger connected thereto.

18. A method of operating a wire/wireless keyboard allowing wire/wireless communication with a computer system, said wire/wireless keyboard having a key function indicator indicative of a specific key function state of a depressed specific function key, said method comprising the steps of:

determining whether the keyboard operates with one of wire and wireless communication with the computer system;

when the keyboard operates with wire communication, enabling the key function indicator of the keyboard;

when the keyboard operates with wireless communication, disabling the key function indicator of the keyboard; and transmitting a wire/wireless signal corresponding to a key input.

19. The method according to claim 18, wherein said step of transmitting the wire/wireless signal comprises the step of determining whether one of the key input and a pointer input of a pointing device is received.

20. A method of communication between a keyboard and a computer, comprising the steps of:

determining, whether said keyboard communicates with said computer via wire or wireless communication;

when said keyboard communicates with said computer via wire communication, enabling a key function indicator of said keyboard;

when said keyboard communicates with said computer via wireless communication, disabling a key function indicator of said keyboard;

determining whether key data or pointer data from a pointing device are inputted;

when one of said key data and said pointer data are inputted, and when said keyboard communicates with said computer via wire communication, delivering said data to a keyboard controller by means of a wire signal; and when said one of said key data and said pointer data are inputted, and when said keyboard communicates with said computer via wireless communication, delivering said data to a wireless transceiver, and transmitting said data to said computer by means of a wireless signal.

21. A computer system, comprising:

a data input device which includes a set of keys; and a computer having key function indicator means provided thereon for indicating a key function state corresponding to a depressed specific function key;

said computer having a front panel on which the key function indicator means is disposed;

wherein said data input device comprises a keyboard having the capability of both wire and wireless communication with said computer;

wherein said data input device generates a key code corresponding to a depressed key;

said system further comprising controller means for selectively transmitting the key code to the computer by one of wire and wireless communication; and wherein said key function indicator means is disabled when said key code is transmitted to said computer by wireless communication.

22. The computer system according to claim 21, wherein said data input device further comprises a pointing device connectable to said keyboard for performing a data printing operation.

* * * * *